K. O. NELSON AND O. ALBERT.
VALVE.
APPLICATION FILED NOV. 8, 1920.
1,438,325.
Patented Dec. 12, 1922.
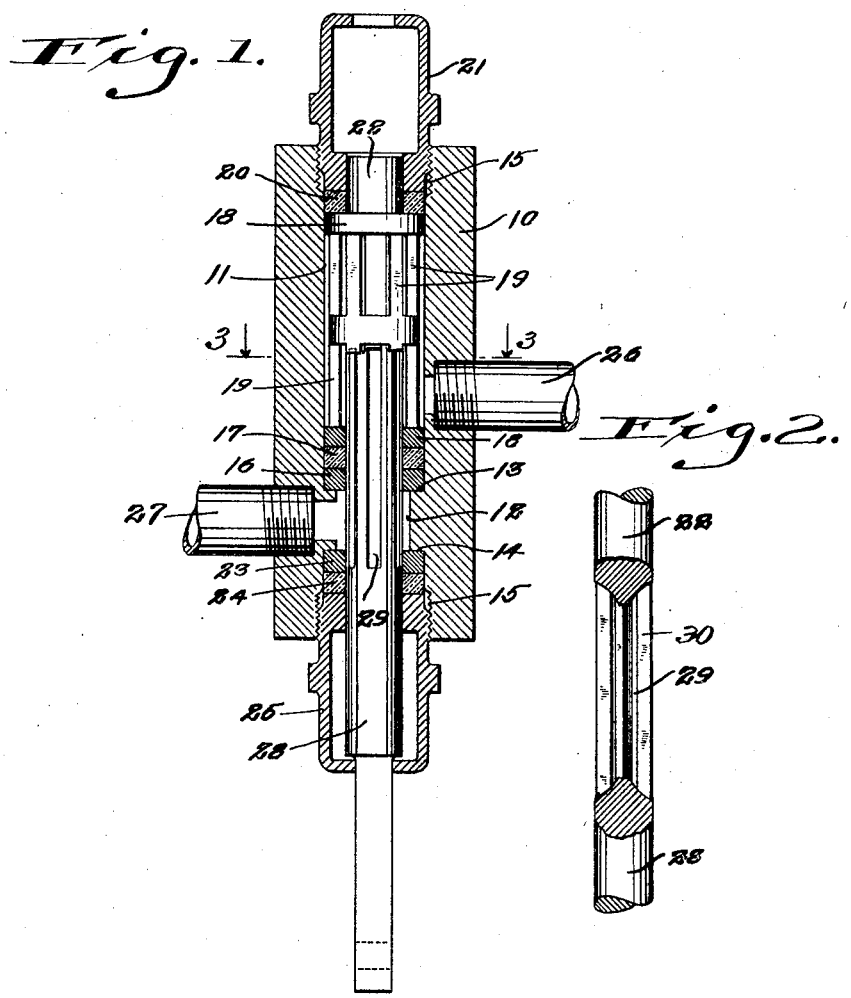
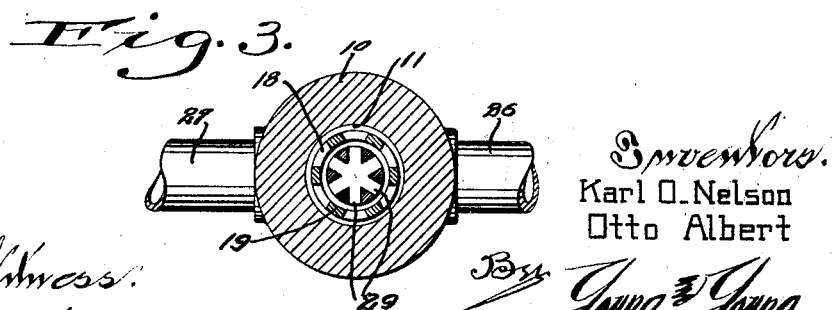
Inventors.
Karl O. Nelson
Otto Albert Patented Dec. 12, 1922.

1,438,325

UNITED STATES PATENT OFFICE.

KARL O. NELSON AND OTTO ALBERT, OF MILWAUKEE, WISCONSIN, ASSIGNORS TO GALLAND-HENNING MFG. CO., OF MILWAUKEE, WISCONSIN.

VALVE.

Application filed November 8, 1920. Serial No. 422,461.

*To all whom it may concern:*

Be it known that KARL O. NELSON and OTTO ALBERT, both citizens of the United States, and residents of Milwaukee, in the county of Milwaukee and State of Wisconsin, have invented certain new and useful Improvements in Valves; and they do hereby declare that the following is a full, clear, and exact description thereof.

Our invention relates to valves of the plunger type, and it is our purpose to provide improvements in the construction of such valves whereby maximum area is obtained to permit a free flow of fluid through the valve to thereby maintain an even pressure on all of its parts, and whereby maximum area is also obtained for supporting the packing material surrounding the plunger to maintain the valve tight, whereby cutting of the packing is eliminated.

One embodiment of our invention is illustrated in the accompanying drawings, but it is to be understood that the structure shown is merely intended to disclose the essential features of our invention and that it might be embodied in various other structures within the scope of our invention as defined in the appended claim.

In the drawings, wherein is illustrated our invention in the best form known to us at present:—

Figure 1 is a vertical section through a valve embodying the essential and novel features of our invention;

Figure 2, a view partly in elevation and partly in section of the plunger; and

Figure 3, a section on the line 3—3 of Figure 1.

Referring to the drawings in detail, 10 designates the block or housing of our improved valve and this block or housing has extending therethrough an opening 11 which is restricted in diameter throughout a short portion of its length as at 12, to thereby provide shoulders 13 and 14, and at each of its ends said opening is internally threaded as at 15.

Seated against the shoulder 13 is a gland ring 16 and upon this ring is arranged suitable packing material 17. A cage comprising spaced end rings 18 and connected by spaced bars 19 is arranged within the opening 11 with one of the rings 18 abutting the packing 17, and the other ring forming a seat or abutment for packing 20. Threaded in one open end of the opening 11 is a gland 21 and the inner end of this gland abuts the packing 20 so that when the gland is screwed inward both the packing 20 and the packing 17 will be squeezed tightly against the sides of a plunger 22 extending through the cage and housing, whereby leakage around the plunger is prevented.

Seated against the shoulder 14 is a gland ring 23 and upon this ring is arranged packing material 24 which is squeezed against the plunger 22 by a gland 25 threaded in the second open end of opening 11 similarly to the gland 21.

An inlet pipe 26 has communication with the larger portion of the opening 11 and with the plunger through the cage, while an outlet pipe 27 communicates with the restricted portion of the opening 11. The plunger 22 is designed to be reciprocated whereby a flow of fluid between the pipes 26 and 27 may be permitted or prevented, and in order to accomplish reciprocating action of the plunger I preferably extend a reduced end of the same through the gland 25 and connect therewith any suitable operating means such as a lever, not shown in the drawings.

The plunger is of elongated cylindrical shape and is solid throughout a portion of its length, as at 28, and throughout another portion of its length is provided with a plurality of radial elongated slots 29 which intersect in the axis of the plunger. When the plunger is moved to the position shown in Figure 1 of the drawings communication is established between the pipes 26 and 27 through the opening 11, the cage and through the said slots 29, and when the plunger is moved longitudinally towards the gland 21 its solid portion 28 extends between the packing materials 17 and 24 and thereby acts as a cut off to prevent communication between the inlet and outlet pipes.

It is to be noted that bars 30 are formed when the plunger is slotted as at 29 and the outer faces of these bars contact with the packing 17 so that maximum area of the plunger is provided for engaging the packing whereby the possibility of the same being cut by the plunger during its operation is eliminated to the greatest possible extent. Likewise the provision of a plurality of radial slots 29 provides maximum area for the flow of fluid through the plunger and due to the arrangement of these slots an area pressure is maintained around the plunger whenever the valve is in operation.

Having thus fully described our invention, what we claim as new, and desire to secure by Letters Patent, is:—

A valve comprising a housing having an opening therein and an inlet and an outlet from said opening, a plunger within said opening for controlling communication between said inlet and said outlet, packing material surrounding the plunger between the inlet and outlet, a cage engaging said packing, a gland, packing between the gland and cage and surrounding the plunger, packing on the side of the outlet opposite the first named packing, and a second gland engaging the last named packing.

In testimony that we claim the foregoing we have hereunto set our hands at Milwaukee, in the county of Milwaukee and State of Wisconsin.

KARL O. NELSON.
OTTO ALBERT.